United States Patent Office 2,973,415
Patented Feb. 28, 1961

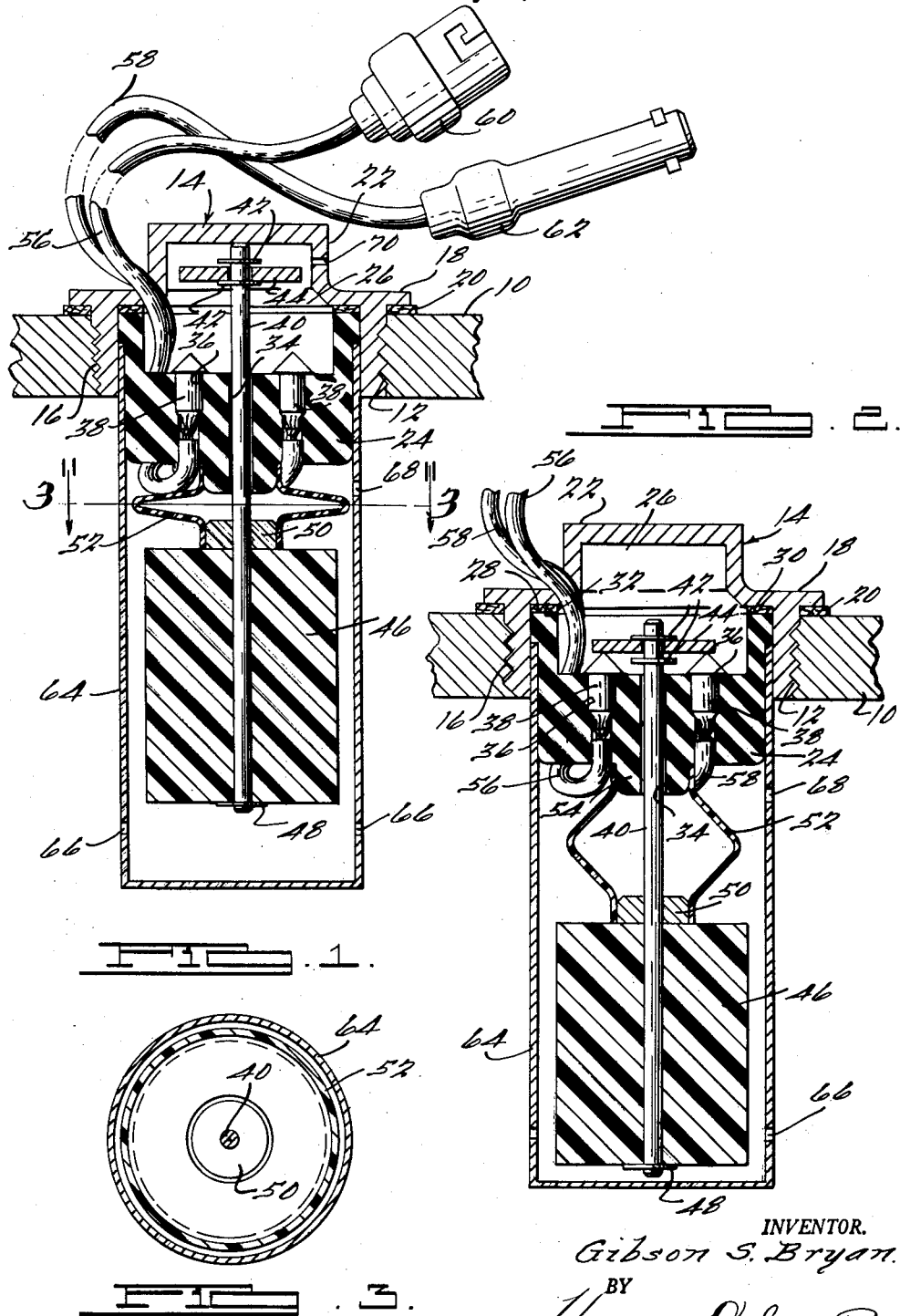

2,973,415

BRAKE FLUID INDICATOR

Gibson S. Bryan, 184 E. Huron St., Pontiac, Mich.

Filed May 29, 1959, Ser. No. 816,886

6 Claims. (Cl. 200—84)

The present invention relates to an improved liquid level indicator apparatus and more specifically, to an improved apparatus for indicating a predetermined change in the level of the liquid within a container, such, for example, as the master cylinder of an automobile brake system.

The indicator apparatus of the present invention is particularly adapted for use in connection with containers for liquids which are of a nature such that they may produce corrosion of contacts or other working parts and may also cause sticking of the relatively moving parts. The hydraulic brake fluid used in automobile hydraulic brake systems is such a liquid and it has been found that previously known indicator apparatus have been unsatisfactory because of the corrosion and sticking caused by the brake fluid.

It is an object of the present invention to provide an improved apparatus particularly adapted for indicating a predetermined change in the level of liquids of the above mentioned type. More specifically, it is an object of the present invention to provide an improved brake fluid indicator apparatus which is simple in design, economical of manufacture and reliable and efficient in operation.

Other and more detailed objects of the present invention will be readily appreciated from a consideration of the following specification, the appended claims and the accompanying drawing wherein:

Figure 1 is a sectional view of an indicator apparatus constructed according to the present invention and showing the indicator apparatus in the position which it occupies when the liquid is at the proper level in the container;

Figure 2 is a sectional view similar to Figure 1, but showing the indicator apparatus in the position occupied when the liquid level has dropped below the predetermined desired level; and, Figure 3 is a transverse sectional view of the structure illustrated in Figure 1, taken substantially along the line 3—3 thereof.

While it will be appreciated from a complete undertanding of the present invention that the improvements thereof may be readily embodied in an appartus for indicating a predetermined change in the liquid level in a wide variety of liquid containers, the improvements of the present invention are herein illustrated and described in an illustrative, but not in a limiting, sense as embodied in a brake fluid level indicator apparatus.

Referring to the drawing, reference character 10 indicates a fragmentary portion of the master cylinder of an automobile hydraulic brake system. The master cylinder 10 has a threaded filler opening 12 through which brake fluid may be added, when necessary, to the master cylinder 10. The opening 12 is normally closed by a cap generally indicated at 14 which has a sleeve portion 16 for engagement in the threaded opening 12 of the master cylinder and has an annular flange 18 which co-operates with the portion of the master cylinder around the periphery of the opening 12 for engaging opposite sides of the annular seal 20. The cap 14 has a central, raised, flat-sided portion 22 for engagement by a suitable wrench in tightening or removing the cap 14. Supported at the inner side of the cap 14 is a generally cylindrical base member 24 which is mounted within the sleeve portion 16 of the cap 14 and co-operates with the cap to define a contact chamber 26. The inner end 28 of the base member 24 seats against a seal 30 supported on an annular shoulder 32 of the cap which extends radially inwardly from the sleeve portion 16. The base member 24, in the preferred embodiment illustrated, is formed of any suitable material which is resistant to the action of brake fluid and is an electrical insulator. This base member 24 has a central aperture 34 extending therethrough communicating at its upper end with the contact chamber 26. At diametrically opposite sides of the aperture 34, the base member 24 has a pair of sockets 36 in which are received contacts 38 having conically shaped contact points extending into the contact chamber 26. A float rod 40 extends through the aperture 34 in the base member 24 and has its upper end disposed within the contact chamber 26 and provided with a pair of longitudinally spaced fixed collars 42 between which is loosely carried a contact disk 44 having a loose fit on the rod 40 to permit any limited tilting of the contact disk 44 which may be necessary to insure proper engagement with both of the contacts 38.

At its opposite end the float rod 40 carries a cylindrical float 46 which may be formed of any suitable material and in the preferred embodiment illustrated, is formed of a plastic material suitably inert to the action of hydraulic brake fluid. The float 46 is held in place between a washer 48 suitably secured adjacent the lower end of the float rod 40 and a cylindrical collar 50 brazed or otherwise suitably secured to the float rod 40. The connection of the collar 50 to the float rod 40 is such as to prevent leakage of the hydraulic brake fluid through the collar 50 around the rod 40. A tubular bellows-type seal 52, formed of rubber or other suitable material, is disposed in generally concentric relation with the rod 40 having its lower end cemented or otherwise sealed to the collar 50 and having its upper end cemented or otherwise sealed to the outer surface of an annular sealing projection 54 disposed centrally of and extending downwardly from the base member 24.

The contacts 38 are connected by insulated electric wires 56 and 58 to female and male connections 60 and 62, see Figure 1, for connecting the indicator apparatus in a suitable electric circuit (not shown) which, in accordance with conventional practice may include an automobile battery and a signal lamp disposed on the instrument panel of the automobile. The wires 56 and 58, as shown in Figures 1 and 2, extend downwardly from the contacts 38 and are reversely turned to pass upwardly through aperture means (not shown) provided in the base member 24 which is suitably sealed to prevent the passage of brake fluid along the wires 56 and 58 into the contact chamber 26.

In the preferred embodiment illustrated, the indicator apparatus also includes a cylindrical casing 64 which encloses the base member 24 and the parts carried thereby and extends inwardly of the master cylinder 10 when the cap 14 is secured in posit'on as illustrated in the drawing. The upper end of the casing 64 fits over the base member 24 and is received within the sleeve portion 16. The protective casing 64 is provided with seepage holes 66 and vents 68 to permit ready equal'zation of the liquid level within the casing 64 with that within the master cylinder 10.

It will be readily appreciated from the foregoing that when the master cylinder 10 is filled with liquid to the desired liquid level, the indicator apparatus will assume the position illustrated in Figure 1, with the contact disk 44 raised above the contacts 38. It will also be appreciated that when the liquid level within the master cylinder 10 drops below a predetermined level, the indicator apparatus will assume the position illustrated in Figure 2, in which the contact disk 44 has moved downwardly to and is supported upon the conical points of the contacts 38. It will be noted that during this movement the volume within the bellows seal 52 is substantially increased. The cap 14 is provided with a small vent opening 70 communicating with the contact chamber 26. During the above described movement air may flow through the vent opening 60 into the contact chamber 26 and through the aperture 34 around the rod 40 to the interior of the seal 52.

It will be appreciated that by the construction described above, the present applicant has provided an improved liquid level indicator apparatus in which the contact chamber is sealed from the liquid and its vapors to prevent corrosion and in which the liquid and its vapors are also sealed from the base member aperture 34 in which the float rod 40 reciprocates during operation of the indicator apparatus, thereby preventing the liquid or its vapors from causing gumming up or sticking which will interfere with the operation of the apparatus.

While only one specific embodiment of the invention has been illustrated and described herein, it will be readily appreciated by those skilled in the art that numerous modifications and changes may be made without departing from the spirit of the present invention.

What is claimed is:

1. In an indicator for indicating a predetermined change in the level of a liquid in a container having an opening therein, a closure member adapted to be mounted in said opening, a second member supported on said closure member and co-operating with said closure member to define a contact chamber, contact means mounted on one of said members, a float support element extending through one of said members having a loosely fitting aperture receiving said support element, said support element being movable relative to said one of said members, through which it extends, to and from a closed circuit position and having one end disposed in said contact chamber and the other end adapted to be disposed in said container when said closure member is mounted in said opening, a contact element disposed within said contact chamber and carried by said one end of said float support element, said contact means being disposed for engagement by said contact element when said float support element is in said closed circuit position, a float mounted on said float support element adjacent said other end thereof, and sealing means disposed externally of said contact chamber and substantially sealing said contact chamber from the liquid and vapor within said container when said closure member is mounted within said opening while permitting free movement of said support element relative to said one of said members through which it extends.

2. In an indicator for indicating a predetermined change in the level of a liquid in a container having an opening therein, a closure member adapted to be mounted in said opening, a second member supported on said closure member and co-operating with said closure member to define a contact chamber, contact means mounted on one of said members, a float support element extending through one of said members and movable relative thereto to and from a closed circuit position and having one end disposed in said contact chamber and the other end adapted to be disposed in said container when said closure member is mounted in said opening, a contact element disposed within said contact chamber and carried by said one end of said float support element, said contact means being disposed for engagement by said contact element when said float support element is in said closed circuit position, a float mounted on said float support element adjacent said other end thereof, and sealing means substantially sealing said contact chamber from the liquid and vapor within said container when said closure member is mounted within said opening, said one of said members through which said float support element extends having a through aperture loosely fitting said float support element and said sealing means including an imperforate bellows-type seal fitted over said float support member and having one end secured and sealed to said one of said members through which said float support element extends in substantially concentric relation with said aperture therethrough and having its other end connected to said float support element between said float and said one end of said float support member in fixed and sealed relation thereto.

3. The invention as defined in claim 2 wherein the one of said members other than the one through which said float support element extends has a vent opening communicating with said contact chamber and adapted when said closure member is mounted in said opening to communicate with the exterior of said container.

4. The invention as defined in claim 2 including a casing mounted on said members and co-operating therewith to enclose said float and said seal and having seepage and vent holes to provide for access of liquid in said container to the interior of said casing.

5. The invention as defined in claim 2 wherein said sealing means includes an annular seal between said closure member and said second member.

6. A brake fluid level indicator for indicating a predetermined drop of the level of liquid in a brake fluid master cylinder having a threaded filler opening, said indicator comprising a cap having an externally threaded sleeve portion adapted to threadedly engage in said filler opening, a base member mounted in said sleeve portion and co-operating with said cap to define a contact chamber and having a central aperture therethrough, a pair of contacts mounted in said base member and having contact points projecting into said contact chamber at opposite sides of said aperture, a float rod extending through said aperture in said base member, a contact disk disposed within said contact chamber, means mounting said disk on one end of said rod for movement therewith while permitting limited tilting of said disk relative to said rod, a float mounted on the other end of said rod, a thrust collar secured to said rod at the end of said float adjacent said base member and against which said float acts to raise said float rod, a bellows-type seal encircling said float rod and having one end sealed to said thrust collar and the other end sealed to said base member outwardly of said aperture, and means for connecting said contacts into an indicator circuit.

References Cited in the file of this patent

UNITED STATES PATENTS

| | | |
|---|---|---|
| 1,323,113 | Sprangers | Nov. 25, 1919 |
| 1,745,031 | Scott | Jan. 28, 1930 |
| 2,214,008 | Boddy | Sept. 10, 1940 |
| 2,894,092 | MacGriff et al. | July 7, 1959 |